United States Patent
Umin et al.

[11] Patent Number: 5,980,837
[45] Date of Patent: Nov. 9, 1999

[54] EXHAUST TREATMENT DEVICE FOR AUTOMOTIVE VEHICLE HAVING ONE-PIECE HOUSING WITH INTEGRAL INLET AND OUTLET GAS SHIELD DIFFUSERS

[75] Inventors: Gerald Umin, New Boston; Erich James Nowka, Ann Arbor; Edward A. Umin, Rockwood; Michael Blake Albrecht, Dearborn Heights; Timothy Y. Morrow, Ypsilanti, all of Mich.; Vincent Harold, Brantford, Canada

[73] Assignee: Ford Global Technologies, Inc., Dearborn, Mich.

[21] Appl. No.: 08/984,497

[22] Filed: Dec. 3, 1997

[51] Int. Cl.⁶ .................................................. B01D 53/34
[52] U.S. Cl. ...................... 422/179; 422/171; 422/177; 422/221
[58] Field of Search ...................... 422/171, 177, 422/179, 180, 222, 221; 60/299, 300; 55/DIG. 30; 502/439

[56] References Cited

U.S. PATENT DOCUMENTS

| | | | |
|---|---|---|---|
| 3,159,239 | 12/1964 | Andrews | 181/282 |
| 3,523,590 | 8/1970 | Straw | 181/282 |
| 3,841,435 | 10/1974 | Hetherington | 181/266 |
| 3,978,567 | 9/1976 | Vroman | 422/179 |
| 4,142,864 | 3/1979 | Rosynsky et al. | 422/179 |
| 4,207,661 | 6/1980 | Mase et al. | 29/890 |
| 4,413,392 | 11/1983 | Otani et al. | 29/890 |
| 4,969,264 | 11/1990 | Dryer et al. | 29/890 |
| 5,096,111 | 3/1992 | Ishikawa et al. | 228/173.2 |
| 5,106,588 | 4/1992 | Sims et al. | 422/180 |
| 5,118,476 | 6/1992 | Dryer et al. | 422/179 |
| 5,119,551 | 6/1992 | Abbott | 29/890 |

FOREIGN PATENT DOCUMENTS

| | | |
|---|---|---|
| 2261553 | 6/1974 | Germany . |
| 58-35218 | 8/1981 | Japan . |
| 58-35219 | 8/1981 | Japan . |

*Primary Examiner*—Hien Tran
*Attorney, Agent, or Firm*—Jerome R. Drouillard

[57] ABSTRACT

An exhaust treatment device for an internal combustion engine includes a generally cylindrical substrate and sealing system which are swaged in place within a one-piece housing. The one-piece housing includes segmented inlet and outlet gas shields and diffusers which are spun from a single piece of tubing which also contains the substrate. The spun inlet and outlet gas shields and diffusers have segmented configurations including multiple concave and convex sections produced by spin-forming of the housing. The exhaust treatment device is assembled without the need for welding or any other high temperature operation.

14 Claims, 3 Drawing Sheets

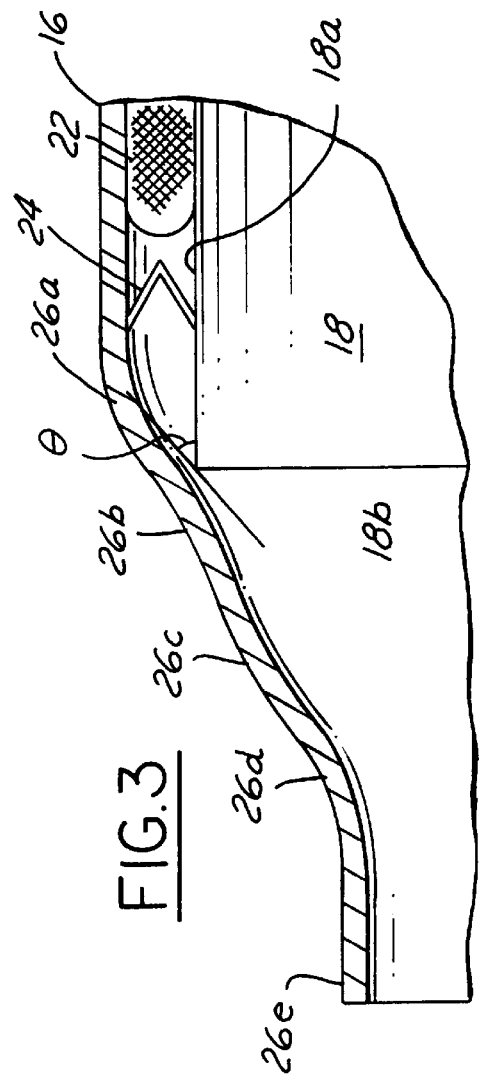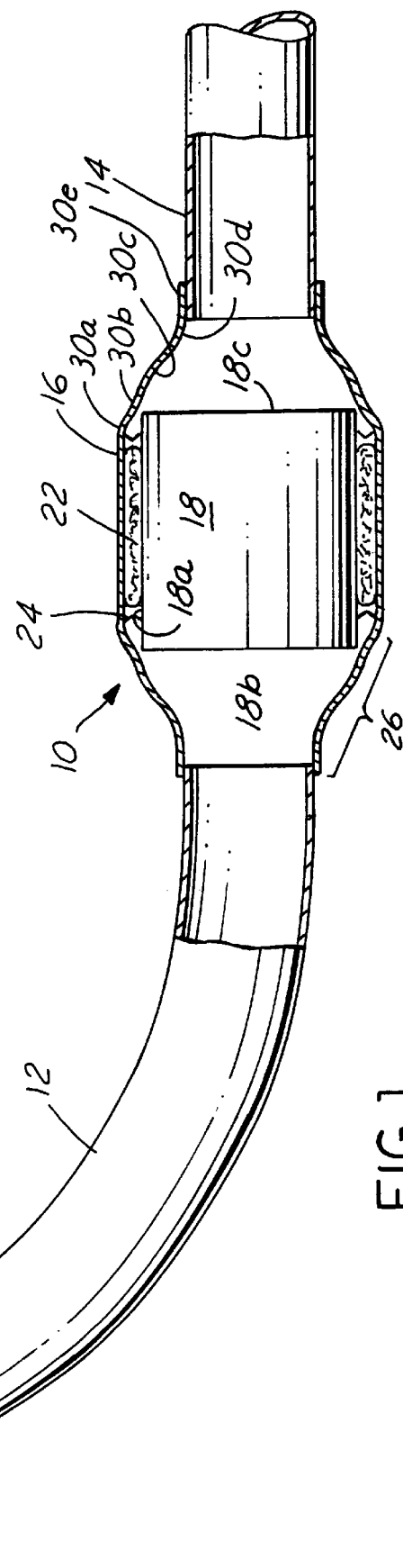

EXHAUST TREATMENT DEVICE FOR AUTOMOTIVE VEHICLE HAVING ONE-PIECE HOUSING WITH INTEGRAL INLET AND OUTLET GAS SHIELD DIFFUSERS

BACKGROUND OF THE INVENTION

1. Field of the Invention

The present invention relates to an exhaust treatment device, which may, for example comprise a catalytic device having a one-piece cylindrical housing, preferably formed of metal, with integral inlet gas shields and diffusers which may be spin-formed.

2. Disclosure Information

The tailpipe emission control laws applicable to automotive vehicles in various countries are becoming increasingly stringent. Tighter standards demand more precise air/fuel ratio control. This is possible only if air leaks in the exhaust system are kept to an absolute minimum, because air leaks cause a loss of air/fuel ratio control capability. A second important consideration relates to the need to rapidly "light off" exhaust treatment devices. Rapid light off requires that certain exhaust treatment devices be located close to the vehicle's engine. Thus, it is highly desirable to have an exhaust treatment device which packages in an extremely small volume, and which, therefore, may be mounted in engine compartment or the toeboard area of a vehicle, or in other areas which do not offer much space for an exhaust treatment device.

Another objective of automotive manufacturers is to reduce cost of vehicles; engine exhaust treatment systems comprise an expensive vehicle system. The present exhaust treatment device, while allowing much 5 more flexible packaging, also allows lower cost because welding and additional parts are eliminated.

U.S. Pat. No. 4,969,264 discloses a catalytic converter and substrate support having a swaged center section and ram-formed ends. Unfortunately, the design of the '264 patent is not suitable for use as an automotive catalytic converter because the ram-formed ends do not provide any protection against undercutting of the support system by the exhaust gases. And, ram forming in close proximity to a catalyst substrate may have the unfortunate consequence of breaking the substrate.

The inventors of the present device have determined that a segmented inlet gas shield and diffuser may be spin-formed rather than ram-formed so as to provide a gas shield, greatly reducing exhaust gas impingement upon the catalytic substrate sealing and support system, while also producing a device of leakproof construction and with a reduced package volume. Additionally, an exhaust treatment device, according to the present invention, having integral diffusers, may be mated with exhaust pipes without a need for additional extensions.

SUMMARY OF THE INVENTION

An exhaust treatment device for an internal combustion engine includes a substrate, generally cylindrical in shape and having a cylindrical outer surface extending between an inlet surface and an outlet surface, and a sealing system applied to the cylindrical outer surface. A one-piece, generally cylindrical housing containing the substrate and for directing the flow of exhaust gas to and from the substrate, includes a center portion swaged upon the substrate such that the sealing system is uniformly compressed and a segmented inlet gas shield and diffuser. The inlet gas shield and diffuser includes a first concave segment extending between the center portion of the housing and a first convex segment which is tangential to the inlet surface of the substrate such that impingement of exhaust gas upon the sealing system is inhibited. The gas shield and diffuser further comprises a second concave segment extending between the first convex segment and a second convex segment having a termination to which an exhaust inlet pipe may be attached. A segmented outlet gas shield and diffuser comprises a first concave segment extending between the center portion of the housing and a first convex segment which is tangential to the outlet surface of the substrate such that impingement of exhaust gas upon the sealing system adjacent the outlet surface of the substrate is inhibited, with the outlet shield and diffuser further comprising a second concave segment extending between the first convex segment and a second convex segment having a termination to which an exhaust outlet pipe may be attached.

The first concave segment of the inlet gas shield and diffuser has a radius of curvature which is approximately twice the radius of curvature of the first convex portion. The first concave segment of the inlet gas shield and diffuser has a radius of curvature with a length which is about one-tenth of the maximum diameter of the generally cylindrical housing. Also, the first convex segment of the inlet gas shield and diffuser has a radius of curvature with a length which is about one-fifth of the maximum diameter of the generally cylindrical housing.

According to another aspect of the present invention, a sealing system comprises a wire mesh mat extending substantially the entire length of the substrate with the mat terminating at both ends with a metallic V-shaped seal. The inlet gas shield and diffuser and outlet gas shield and diffuser may be spin-formed after the substrate has been swaged and placed within the housing. Other alternatives are possible for the spin-forming, regarding the precise sequence of locating a substrate within the housing prior to spin-forming one end of the housing. In either event, the first concave segment of the inlet gas shield and diffuser extends inwardly at approximately 45° to the cylindrical outer surface of the substrate.

According to yet another aspect of the present invention, a process for assembling an exhaust treatment device comprises the steps of inserting an exhaust treatment substrate into a cylindrical metallic tube, reducing the diameter of the tube by swaging such that the substrate is held firmly in place within the tubing, and spin-forming gas shielding diffusers from the tube at opposite ends of the exhaust treatment device. It is an advantage of the present invention that an exhaust treatment device made according to this invention will be of one-piece, leak-proof construction.

It is a further advantage of the present invention that an exhaust treatment device made according to this invention will be economical to produce.

It is yet another advantage of the present invention that an exhaust treatment device made according to this invention will have small package volume and therefore will be able to fit into smaller locations in all types of automotive vehicles.

It is yet another advantage of the present invention that an exhaust treatment device made according to this invention may be produced with flexible manufacturing systems, lending themselves readily to changes in length and diameter of the exhaust treatment device.

It is yet another advantage of the present invention that an exhaust treatment device made according to this invention may be produced without the need for either welding or any other high temperature operation.

Other advantages and features of the present invention will become apparent to the reader of this specification.

BRIEF DESCRIPTION OF THE DRAWINGS

FIG. 1 illustrates an exhaust pipe assembly having an exhaust treatment device according to the present invention.

FIG. 3 is an enlarged section of the exhaust treatment device taken inside the circle 3 of FIG. 2.

DETAILED DESCRIPTION OF PREFERRED EMBODIMENTS

Figure 2:
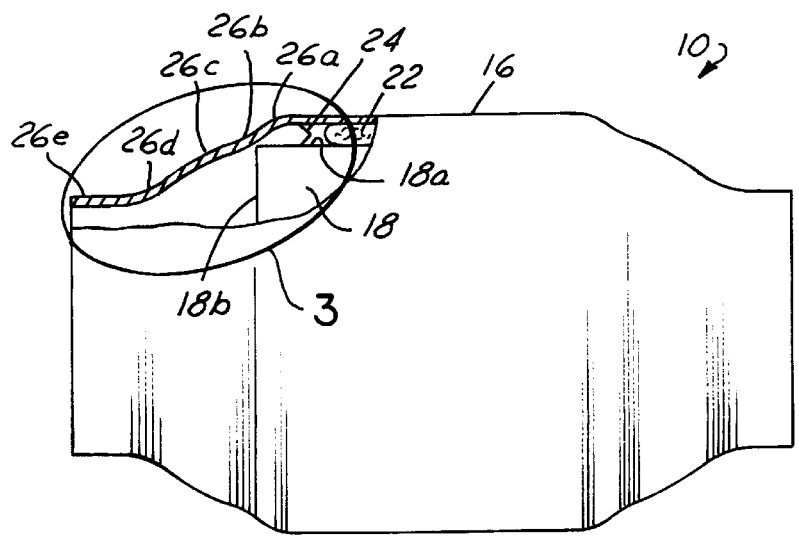
FIG. 2 is a plan view, partly broken-away, of the exhaust treatment device of FIG. 1.

As shown in FIG. 1, exhaust treatment device 10 is mounted between inlet pipe 12 and outlet pipe 14. Inlet pipe 12 is intended to conduct gases from an internal combustion engine to exhaust treatment device 10. As shown in the various figures, exhaust treatment device 10 has a one-piece, unitary, generally cylindrical housing for containing substrate 18. Notice that no welding is required to assemble the present exhaust treatment device.

Substrate 18 is generally cylindrical in shape and has an outer cylindrical surface 18a (FIGS. 1 and 2) extending between inlet surface 18b and outlet surface 18c. Although inlet surface 18b and outlet surface 18c are shown as being planar, those skilled in the art will appreciate in view of this disclosure that other types of surfaces may be used in an exhaust treatment device according to the present invention. It will be further appreciated in view of this disclosure that substrate 18 could comprise either a ceramic monolith, or a wound thermal reactor element, or yet other types of exhaust treatment devices known to those skilled in the art and suggested by this disclosure. As such, the term "substrate", as used herein, is intended to encompass all of these types of devices.

In the event that substrate 18 is a monolithic ceramic brick, it will be necessary to provide a sealing system which will be applied to the cylindrical outer surface 18a of substrate 18. As shown in FIGS. 1, 2 and 3, a sealing system comprised of wire mesh 22 and metallic V-seals 24 is applied to outer surface 18a. The purpose of wire mesh 22 is to compressively and securely hold substrate 18 in place within center portion 16 of the generally cylindrical housing. The purpose of metallic V-seals 24 is to work in conjunction with the inlet and outlet gas shield and diffusers described below to inhibit the ingress of exhaust gases into the area occupied by wire mesh 22. Those skilled in the art will appreciate in view of this disclosure that it is possible to use ceramic mat material and other types of seals with an exhaust treatment device according to the present invention. Such mat and seal combinations are well-known to those skilled in the art and several are suggested by this disclosure.

In order for any exhaust treatment device to function properly, it is necessary that an inlet diffuser be provided which promotes an even field of flow across the entire substrate of the device. Typically, conically shaped diffusers are used. Of course, such conically shaped diffusers have traditionally been formed by stamping techniques-techniques which are not suitable for the one-piece construction of the exhaust treatment device according to the present invention because it is not possible to place stamping tools within the confines of a device once the substrate has been inserted. Applicants have solved the problems inherent in making a one-piece exhaust treatment device by using a room temperature or cold-spinning process for the purpose of forming one-piece integral gas shield and diffuser combinations on either end of the exhaust treatment device.

As shown in FIG. 3, it is essential that the gas shield and diffuser pass, in a tangential position, very closely to the inlet surface 18b, or, more precisely, the intersection between inlet surface 18b and cylindrical outer surface 18a of substrate 18.

As noted above, inlet gas shield and diffuser 26 is produced by spin-forming, which is discussed below in conjunction with FIGS. 6 and 7. Because spin-forming cannot produce a straight-sided cone, it is necessary that a segmented curve be produced for inlet gas shield and diffuser 26. Various segments of gas shield and diffuser 26 are shown in FIG. 3, beginning with first concave segment 26a extending between center portion 16 of the housing and a first convex segment 26b. Note that convex segment 26b is tangential to substrate 18 at the intersection of inlet surface 18b and cylindrical outer surface 18a of substrate 18. In practice, the inventors of the present device have determined that the separation between first convex segment 26b and the intersection of inlet surface 18b and cylindrical outer surface 18a of substrate 18 should be not more than 4 mm for an exhaust treatment device having an outer diameter of approximately 100 mm. It is further noted in FIG. 3, that the radius of curvature of first convex section 26b is approximately twice the radius of curvature of first concave section 26a. And, the radius of curvature of first concave segment 26a is about one-tenth of the maximum diameter of the cylindrical housing. Finally, the radius of curvature of first convex segment 26b is approximately one-fifth of the maximum diameter of the cylindrical housing.

The aforementioned geometrical relationships produce an angle, $\Theta$, which is included between the inner surface of the catalyst housing in the area of surfaces 26a and 26b, of about 45°. In this manner, impingement of exhaust gas upon the sealing system is inhibited, with the corresponding result that substrate 18 is maintained securely within center portion 16 of the cylindrical housing throughout the useful life of the present exhaust treatment device.

Inlet gas shield and diffuser 26 is completed by second concave segment 26c and by second convex segment 26d which terminates in section 26e, which effectively forms a pipe to which exhaust inlet pipe 12 may be attached.

Segmented outlet gas shield and diffuser 30 is of similar construction to shield and diffuser 26 and may be spun in the same manner as shield and diffuser 26. Accordingly, first concave segment 30a transitions into first convex segment 30b which, in turn, transitions into second concave segment 30c, and thence to second convex segment 30d. As with inlet gas shield and diffuser 26, final segment 30e provides a convenient point for attaching outlet pipe 14.

FIGS. 4–8 illustrate a process according to another aspect of the present invention. Prior to entering into a detailed discussion of FIGS. 4–8, it should be noted that inlet gas shield and diffuser 26 may be spin-formed prior to swaging of substrate 18 into place within the outer housing, or spin-forming of inlet gas shield and diffuser 26 may occur after the swaging operation. What is important is that the spin-forming operation is capable of producing the very tight tangential fit between first convex segment 26b of inlet gas shield and diffuser 26 and substrate 18. Other means of forming the exhaust treatment device housing, such as pressing or die forming, would simply not lend themselves to producing devices having the structural configuration of a device according to the present invention.

Figure 4:
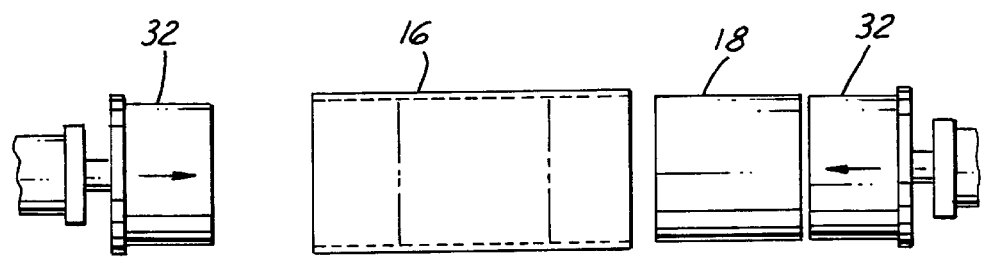
FIGS. 4–8 illustrate the processing of an exhaust treatment device according to the present invention.

FIG. 4 illustrates the first part of a process of producing an exhaust treatment device according to the present invention. FIG. 4 illustrates the insertion of substrate 18 into center portion 16 of a cylindrical housing. Locators 32 are used to assure that substrate 16 is located precisely within center portion 16 of the housing.

Figure 5:
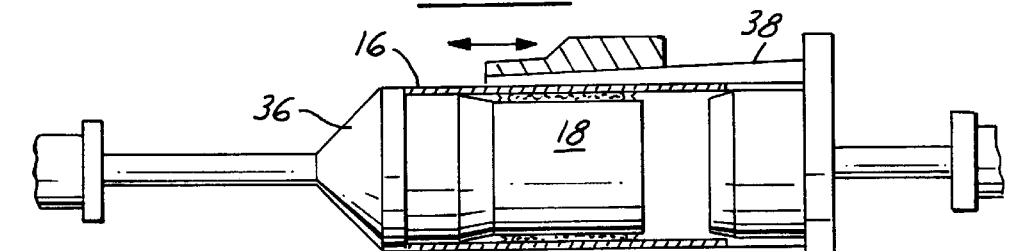

Turning now to FIG. 5, center portion 16 of the housing is swaged upon substrate 18 so that the sealing system, in this case comprising wire mesh 22 and V-seals 24, is compressed, with the result that substrate 18 and the sealing system will be held tightly by center portion 16 so as to avoid breakage of the substrate and/or leakage of gases past the substrate; either of which will greatly impair the function of any exhaust treatment device. The swaging process uses a swaging ram 36 which holds the exhaust treatment device within a swaging collet 38, which is described in detail in U.S. Pat. No. 5,724,735, and which is assigned to the assignee of the present invention. Pallet 38 and collar 40 cooperate to uniformly reduce the diameter of center section 16 to a smaller value so as to compress the seal system including wire mesh 22 and V-seals 24.

Figure 6:
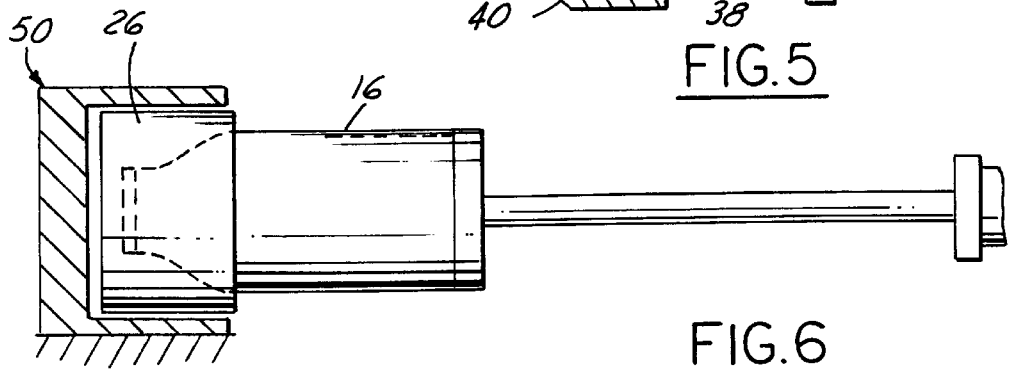
Figure 7:
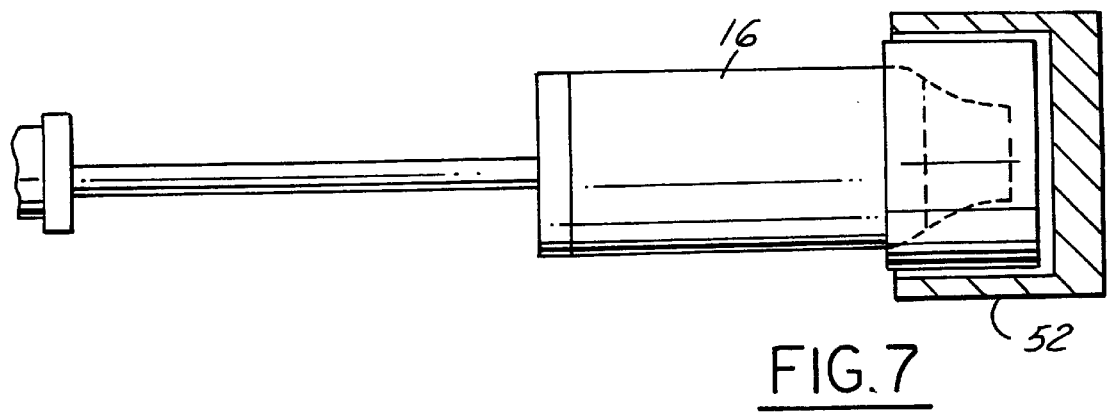
Figure 8:
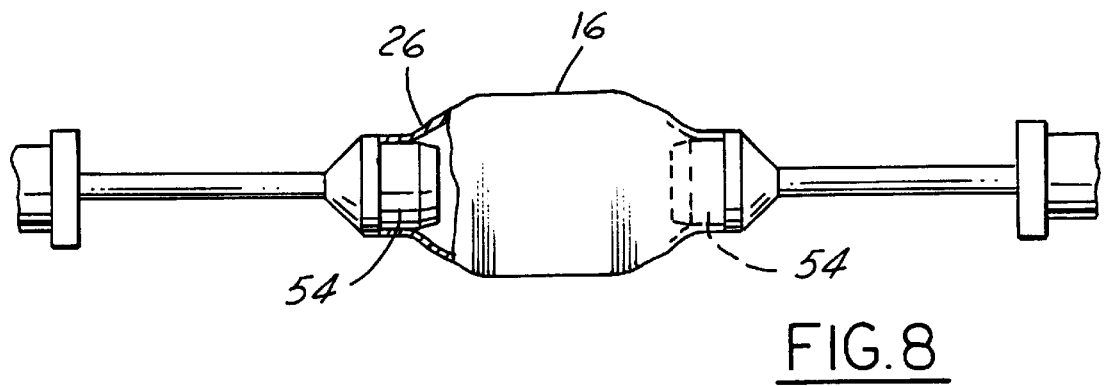

Once center portion 16 is swaged down upon the substrate and seal assembly, the process moves to FIG. 6, wherein a first segmented gas shield and diffuser is spun-formed at one end of the tube which comprises the housing of the present exhaust treatment device. The spin-forming is begun by first spin-forming head 50. Then, the opposite end of the housing is spun by a second spin-forming head 52, as shown in FIG. 7. Finally, the ends of the exhaust treatment device, which are really the ends of the gas shielding diffusers, are sized, as shown in FIG. 8, by sizers 54, which assures that the openings formed in the gas shields and diffusers are cylindrical so as to accept an exhaust pipe.

Figure 9:
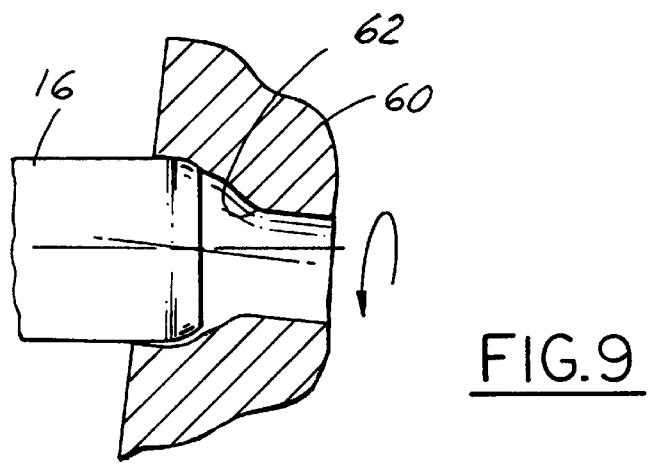
FIG. 9 illustrates a spin-forming portion of the process illustrated in FIG. 4.

FIG. 9 illustrates the central portion 60 of an orbital spin-forming tool of the type known to those skilled in the art and suggested by this disclosure. It is noted that central cavity 62 of the central portion 60 of the tool has a profile closely approximating the final profile for the inlet and outlet gas shield and diffuser portions of the present invention. Forming cavity 62 engages the cylindrical metallic tube of the present device with an orbital or nutational motion as the forming cavity moves axially into engagement with the metallic tube. In this manner, the inlet and outlet gas shield and diffusers are formed by spinning heads 52.

While the invention has been shown and described in its preferred embodiments, it will be clear to those skilled in the arts to which it pertains that many changes and modifications may be made thereto without departing from the scope of the invention. For example, the length and diameter of an exhaust treatment device according to the present inventive concept may be adjusted to produce a device having a different aspect ratio, i.e., the ratio of the length to the diameter, by merely changing the diameter of the tubing and/or the length of the tubing blank from which the device is formed.

We claim:

1. An exhaust treatment device for an internal combustion engine, comprising:
   a substrate being generally cylindrical in shape and having a cylindrical outer surface extending between an inlet surface and an outlet surface;
   a sealing system applied to said cylindrical outer surface; and
   a one-piece, generally cylindrical housing for containing the substrate and for directing a flow of exhaust gas to and from the substrate, with said housing comprising:
   a center portion swaged upon the substrate such that the sealing system is uniformly compressed;
   a segmented inlet gas shield and diffuser comprising a first concave segment extending between the center portion of the housing and a first convex segment which is tangential to the inlet surface of the substrate, such that impingement of exhaust gas upon the sealing system is inhibited, with the inlet shield and diffuser further comprising a second concave segment extending between the first convex segment and a second convex segment having a termination to which an exhaust inlet pipe may be attached; and
   a segmented, outlet gas shield and diffuser comprising a first concave segment extending between the center portion of the housing and a first convex segment which is tangential to the outlet surface of the substrate, such that impingement of exhaust gas upon the sealing system is inhibited, with the outlet shield and diffuser further comprising a second concave segment extending between the first convex segment and a second convex segment having a termination to which an exhaust outlet pipe may be attached.

2. An exhaust treatment device according to claim 1, wherein said first convex segment of said inlet gas shield and diffuser has a radius of curvature which is approximately twice the radius of curvature of the first concave segment.

3. An exhaust treatment device according to claim 1, wherein said first concave segment of said inlet gas shield and diffuser has a radius of curvature with a length which is about one-tenth of the maximum diameter of the generally cylindrical housing.

4. An exhaust treatment device according to claim 1, wherein said first convex segment of said inlet gas shield and diffuser has a radius of curvature with a length which is about one-fifth of the maximum diameter of the generally cylindrical housing.

5. An exhaust treatment device according to claim 1, wherein said sealing system comprises a wire mesh mat extending substantially the entire length of the substrate, with the mat terminating at both ends with a metallic V-shaped seal.

6. An exhaust treatment device according to claim 1, wherein the inlet and outlet gas shields and diffusers are spin-formed.

7. An exhaust treatment device according to claim 4, wherein the inlet and outlet gas shields and diffusers are spin-formed at room temperature.

8. An exhaust treatment device according to claim 1, wherein the inlet and outlet gas shields and diffusers are spin-formed after the substrate has been swaged in place within the housing.

9. An exhaust treatment device according to claim 1, wherein the inlet gas shield and diffuser is spin-formed before the substrate is swaged in place within the housing, and the outlet gas shield and diffuser is spin-formed after the substrate has been swaged in place within the housing.

10. An exhaust treatment device according to claim 1, wherein the first concave segment of said inlet gas shield and diffuser extends inwardly at approximately 45° to the cylindrical outer surface of the substrate.

11. An exhaust treatment device for an internal combustion engine, comprising:
    a substrate being generally cylindrical in shape and having a cylindrical outer surface extending between an inlet surface and an outlet surface;

a sealing system applied to substantially the entirety of said cylindrical outer surface; and a one-piece, generally cylindrical housing for containing the substrate and for directing a flow of exhaust gas to and from the substrate, with said housing comprising:

a cylindrical center portion swaged upon the substrate such that the entire sealing system is uniformly compressed, whereby the substrate will be prevented from moving with respect to the housing;

a segmented, spin-formed inlet gas shield and diffuser comprising a first concave segment extending inwardly at approximately 45° between the center portion of the housing and a first convex segment which is tangential to the inlet surface of the substrate, such that impingement of exhaust gas upon the sealing system is inhibited, with the inlet gas shield and diffuser further comprising a second concave segment extending between the first convex segment and a second convex segment having a termination to which an exhaust inlet pipe may be attached; and a segmented, spin-formed outlet gas shield and diffuser comprising a first concave segment extending inwardly at approximately 45° between the center portion of the housing and a first convex segment which is tangential to the outlet surface of the substrate, such that impingement of exhaust gas upon the sealing system is inhibited, with the outlet gas shield and diffuser further comprising a second concave segment extending between the first convex segment and a second convex segment having a termination to which an exhaust outlet pipe may be attached.

12. An exhaust treatment device according to claim 11, wherein said substrate comprises a monolithic ceramic element through which the exhaust gas flows.

13. An exhaust treatment device according to claim 11, wherein said first convex segment of said inlet gas shield is tangent to the circular edge formed by the intersection of the inlet surface and the cylindrical outer surface of the substrate.

14. An exhaust treatment device according to claim 13, wherein the axial distance between said first convex segment and the circular edge formed by the intersection of the inlet surface and the cylindrical outer surface of the substrate is not greater than 4 mm.

* * * * *

UNITED STATES PATENT AND TRADEMARK OFFICE
Certificate

Patent No. 5,980,837                                                                                  Patented: November 9, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Keiichi Suehiro, Matsumoto, Japan; and Kenji Masuda, Suwa, Nagano, Japan.

Signed and Sealed this Sixth Day of April 2004.

GLEN CALDAROLA
*Supervisory Patent Examiner*
Art Unit 1764

UNITED STATES PATENT AND TRADEMARK OFFICE
Certificate

Patent No. 5,980,837                                                                             Patented: November 9, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gerald Umin, New Boston, MI; Erich James Nowka, Ann Arbor, MI; Edward A. Umin, Rockwood, MI; Michael Blake Albrecht, Dearborn Heights, MI; Timothy Y. Morrow, Ypsilanti, MI; Vincent Harold, Brantford, Canada; F. Leon Bergeron, Dearborn Heights, MI; Brian M. Chomicz, St. Clari Shores, MI; and Bryce A. Schwager, Ypsilanti, MI.

Signed and Sealed this Twentieth Day of July 2004.

GLEN CALDAROLA
                                                                                                *Supervisory Patent Examiner*
                                                                                                                 *Art Unit 1764*